US007439442B2

(12) United States Patent
Schutte

(10) Patent No.: US 7,439,442 B2
(45) Date of Patent: Oct. 21, 2008

(54) RADIANT ELEMENT HOUSING

(75) Inventor: Bernhard Schutte, Langenfeld (DE)

(73) Assignee: **Ba*Ro GmbH & Co. KG**, Leichlingen (DE)

( * ) Notice: Subject to any disclaimer, the term of this patent is extended or adjusted under 35 U.S.C. 154(b) by 38 days.

(21) Appl. No.: 11/605,229

(22) Filed: Nov. 29, 2006

(65) Prior Publication Data

US 2008/0029286 A1 Feb. 7, 2008

(51) Int. Cl.
*H02G 3/08* (2006.01)

(52) U.S. Cl. ............................. 174/50; 174/53; 174/58; 439/535; 248/906

(58) Field of Classification Search .................. 174/50, 174/53, 58, 57, 17 R, 17 T, 135; 220/3.92, 220/3.94, 4.02; 361/641, 600, 601; 439/535; 248/906; 362/147; 312/351.11
See application file for complete search history.

(56) References Cited

U.S. PATENT DOCUMENTS 6,057,509 A * 5/2000 Simmons .................... 174/53

* cited by examiner

*Primary Examiner*—Dhiru R Patel
(74) *Attorney, Agent, or Firm*—Berenato, White & Stavish

(57) ABSTRACT

A housing has two housing modules that are releasably connected to one another. The housing modules are releasably connected to one another at oppositely located wall regions via corresponding pairs of slots and hooks in engagement therewith. A snap-lock device is provided which locks the housing modules in the connected state in order to prevent unintentional release.

10 Claims, 5 Drawing Sheets

20
22
26
24
3c
7
6
3d
3
4
9
2

RADIANT ELEMENT HOUSING

CROSS-REFERENCE TO RELATED APPLICATIONS AND CLAIM TO PRIORITY

This application is related to utility model application number 20 2006 012 163.3, filed Aug. 7, 2006 in the Federal Republic of Germany, the contents of which are incorporated herein by reference and to which priority is claimed.

FIELD OF THE INVENTION

The invention relates to a housing having two housing modules that are releasably connected to one another.

BACKGROUND OF THE INVENTION

Housings are used for a very wide variety of types of units and devices. In electrical units in particular they are indispensable for protecting the electrical components, ensuring shielding, and protecting the user from an inadvertent electrical shock caused by touching the components.

In many cases, for example in the context of radiant element housings, the housing is embodied in multiple parts, the electronic control system being accommodated in a first housing module and the radiant element itself in a second housing module. In the case of multiple-part housings known in the existing art, the housing modules are connected, for example, with screws. A plurality of screws are necessary, however, to ensure stable connection of the housing modules. It is disadvantageous in this context that a considerable expenditure of work is required both when connecting the housing modules and when separating them, for example for maintenance purposes. In addition, tools (in this case a screwdriver) must be used, which makes the procedure even more complicated.

SUMMARY OF THE INVENTION

It is therefore the object of the present invention to make available a housing in which two housing modules are releasably connected to one another in such a way that they can be connected to one another and separated from one another quickly and easily, in particular without the use of a tool.

This object is achieved in that the housing modules are releasably connected to one another at oppositely located wall regions via corresponding pairs of slots and hooks in engagement therewith; and that a snap-lock device is provided which locks the housing modules in the connected state in order to prevent unintentional release.

The basic idea of the present invention is therefore to connect the two housing modules via corresponding pairs of hooks and slots, and to secure that connection with the aid of a snap-lock device. In the connected state, the pairs of hooks and slots ensure chiefly that the two housing modules are attached to one another in such a way that oppositely directed motions perpendicular to the connected wall regions are suppressed. The snap-lock device is intended to secure the connection of the housing modules and prevent the housing modules from moving relative to one another parallel to the connected wall regions. They additionally contribute to preventing any bending motion of the housing modules perpendicular to their connection axis.

In a further embodiment of the invention, provision is made for one open side of one housing module to be closed off by a cover that is releasably connected, in particular via a snap-lock connection, to a wall region of the housing module, and that possesses tabs which engage into corresponding slots of the other housing module. Here the connection between the two housing modules is stabilized by the fact that the cover of one housing module, which cover is fixedly connected, for example via a snap-lock device, to a partition of the housing module, comprises tabs that engage into corresponding slots of the other housing module. This ensures that the two housing modules cannot be bent away from one another.

Particular advantages of the housing according to the present invention are that the housing modules can be securely connected to one another quickly and without the use of tools, and can be separated from one another again just as quickly.

The housing according to the present invention is suitable for the reception of electrical apparatuses, in particular for the reception of a radiant element. Advantageously, components of the radiant element that are to be physically separated from one another, for example the electronic control system and the radiant element itself, can be accommodated in the individual housing modules.

According to an embodiment of the invention, the housing can be made entirely or partly of metal or plastic. It is advantageous that metal exhibits high stability. Housing parts made of plastic, in turn, have a low weight and are economical to manufacture. In addition, they constitute electrical shielding for an electrical apparatus that may be present in a housing.

Provision can furthermore be made for at least one housing module to be manufactured from a flat sheet that comprises fold seams, so that the housing module can be set up, in the manner of a carton, by appropriate folding along the fold seams. It is useful in this context if the housing module comprises retention devices for the connection of wall regions that are adjacent in the folded state. These retention devices can comprise a tab-shaped element on one wall region and a slot in a further wall region adjacent thereto for receiving the tab-shaped element.

A particular advantage of folded housing modules is that the flat sheet of which they are made up has a very much smaller transport volume than the housing module itself. As a result, the housing module can be transported in the flat, unfolded state, and quickly and easily set up and assembled only upon final assembly.

BRIEF DESCRIPTION OF THE FIGURES

The invention will be explained in more detail below with reference to an exemplifying embodiment referring to the drawings, in which.

DETAILED DESCRIPTION OF THE PREFERRED EMBODIMENT(S)

Figure 1:
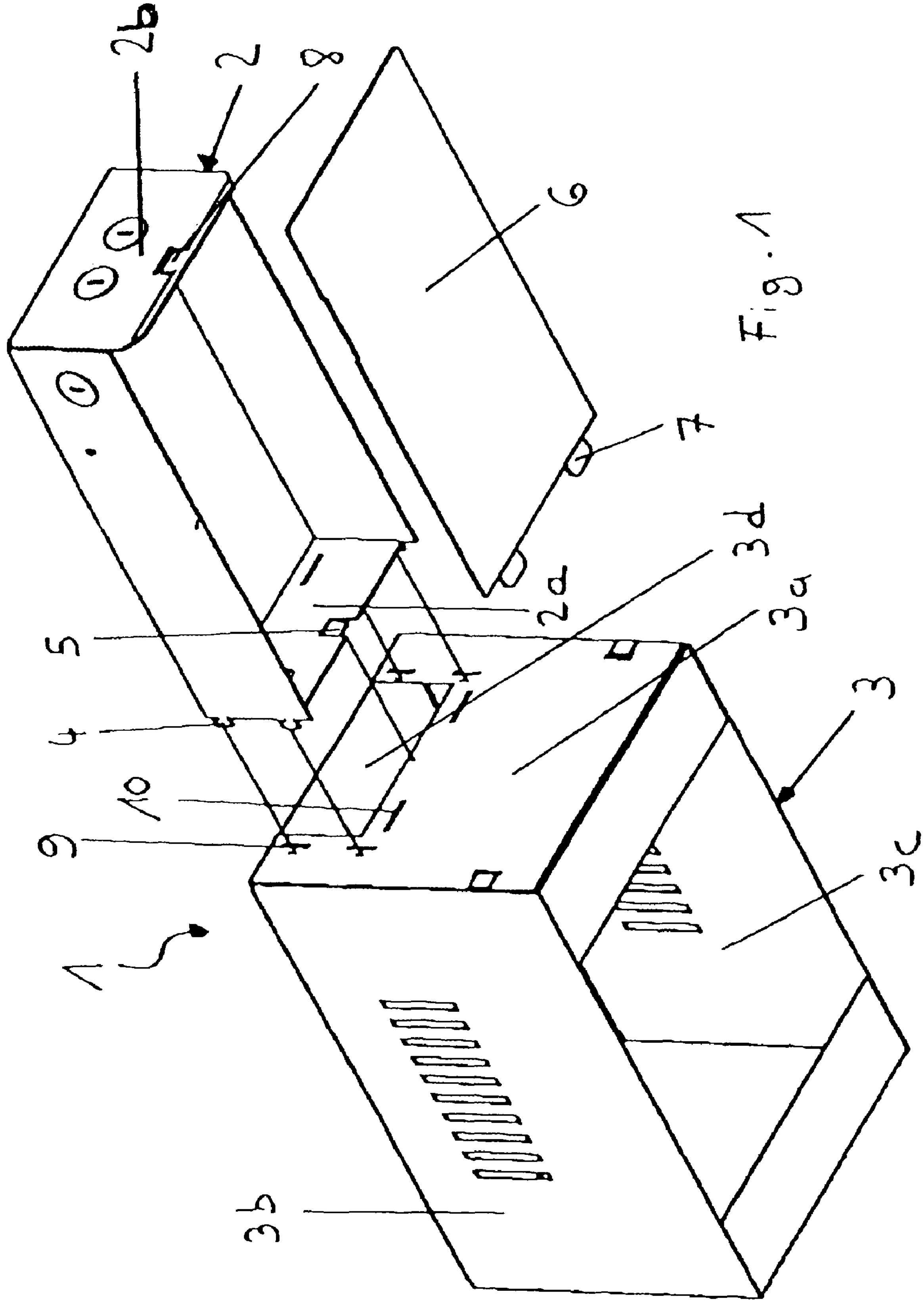
FIG. 1 is an exploded view of a housing according to the present invention.

FIG. 1 shows a housing 1 according to the present invention in an exploded view. Housing 1 is embodied to be mounted on a ceiling. It comprises a smaller first housing module 2 embodied in a box shape, and a larger second housing module 3 likewise of box-like configuration, which are arranged next to one another and are connected to one another. In this case housing 1 is provided for the reception of a radiant element, the electronic control system being accommodated in first housing module 2 and the radiant element itself in second housing module 3.

First housing module 2 is equipped with hooks 4 on a wall region 2*a* that is located opposite second housing module 3. Also embodied on this wall region 2*a* is a snap lug constituting a first snap-lock device 5.

A lower wall region of first housing module 2 is embodied as a removable cover 6, and comprises two tabs 7 on its end region facing toward second housing module 3. Wall region 2*b*, facing away from second housing module 3, of first housing module 2 comprises a snap lug 8 with which cover 6 can be retained on the first housing module.

Figure 4:
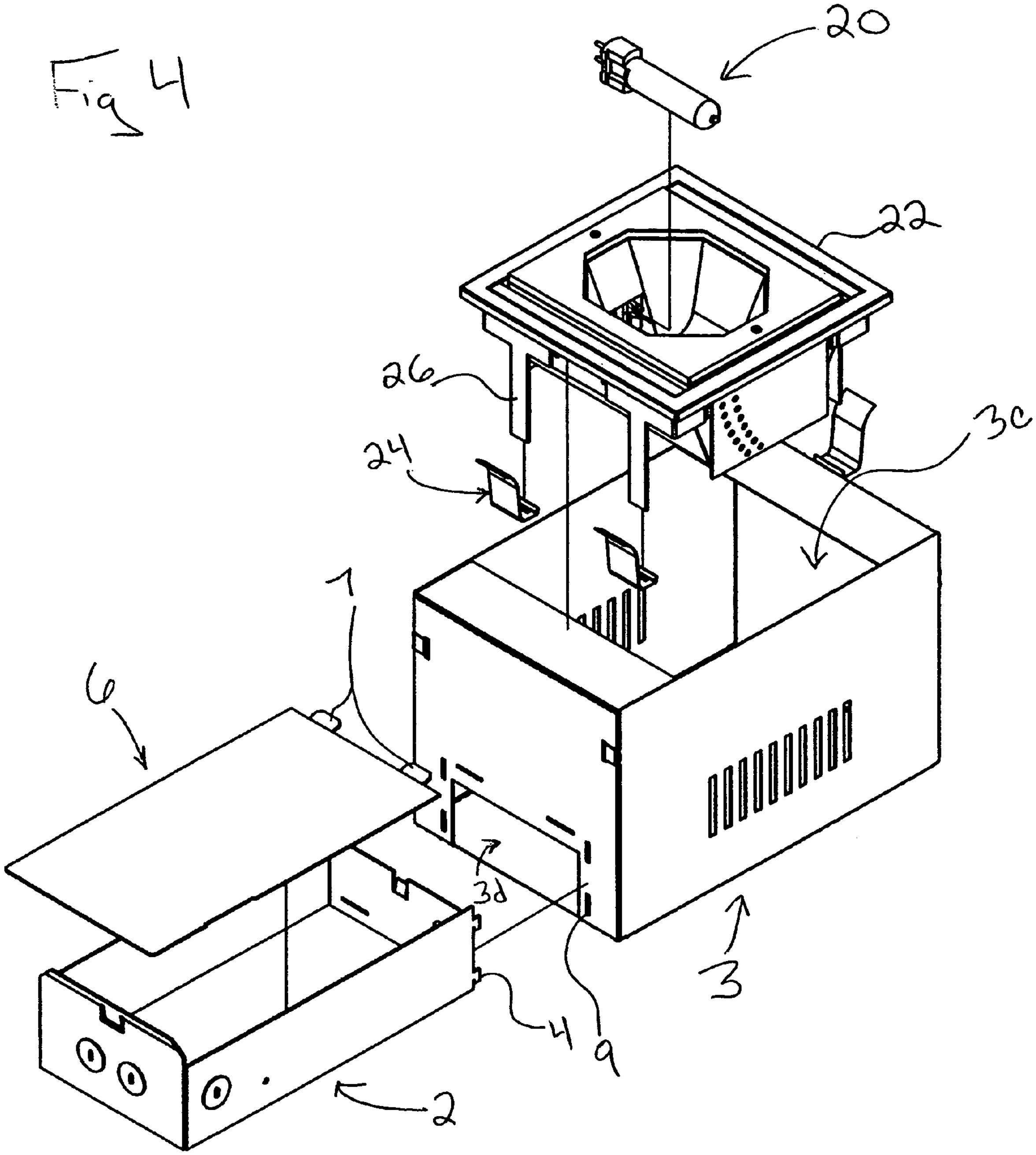
FIG. 4 is an exploded view of a housing and radiant element according to the present invention.
Figure 5:
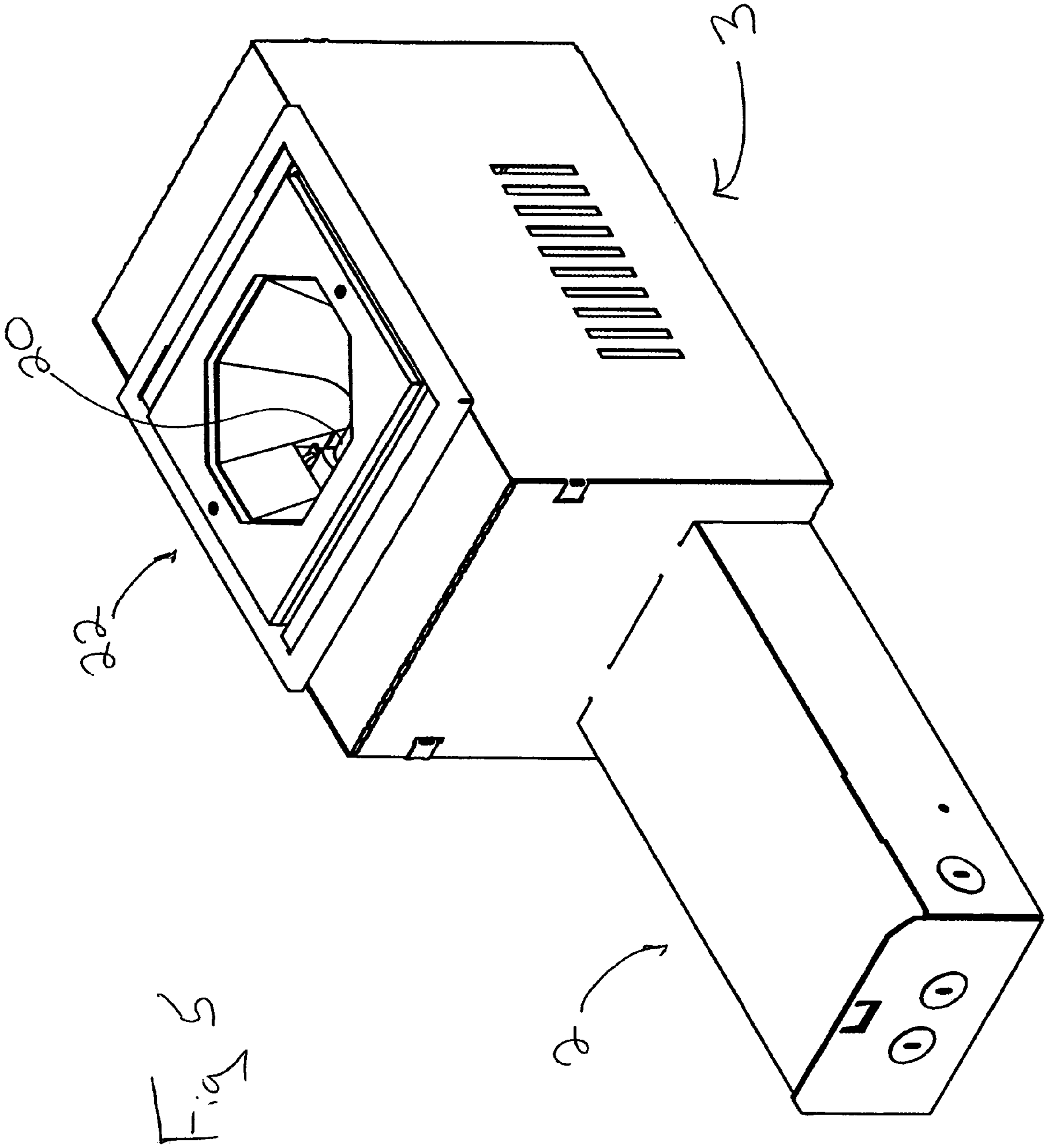
FIG. 5 is a perspective view of the housing according to FIG. 4.

Second housing module 3 is equipped, in wall region 3*a* that is located opposite wall region 2*a* of first housing module 2, with slots 9 corresponding to hooks 4. Also embodied in this wall region 3*a* are slots 10 for the reception of tabs 7 of cover 6. A light outlet opening 3*c* is furthermore embodied on the lower side of second housing module 3. Second housing module 3 moreover comprises in wall region 3*a* a cutout 3*d* for wall region 2*a* of first housing module 2. As shown in FIGS. 4 and 5, a radiant heating element 20, such as a radiant lamp, is provided, which is securable within a radiant heating housing 22. Radiant heating housing 22 is configured to be received within light outlet opening 3*c*, and may be secured therein via clips 24. Alternatively, housing module 3 may include slots (not shown) for receiving tabs 26 of radiant heating housing 22. Further, it should be understood that any radiant element or other electrical component may be provided and secured within outlet opening 3*c*, depending on the particular application of housing 1. In order to connect housing modules 2 and 3 to one another, in a first step hooks 4 of first housing module 2 are inserted into slots 9 of second housing module 3, and first housing module 2 is then slid upward (in the drawing) parallel to the plane of wall regions 2*a*, 3*a*, so that hooks 4 fit behind wall region 3*a* of second housing module 3. When hooks 4 are in their final position, wall region 2*a* of the first housing module is located in front of opening 3*d* of second housing module 3, and snap lug 5 fits in snap-locking fashion behind the rim of cutout 3*d*. A connection is thereby created between the two housing modules 2 and 3.

Figure 2:
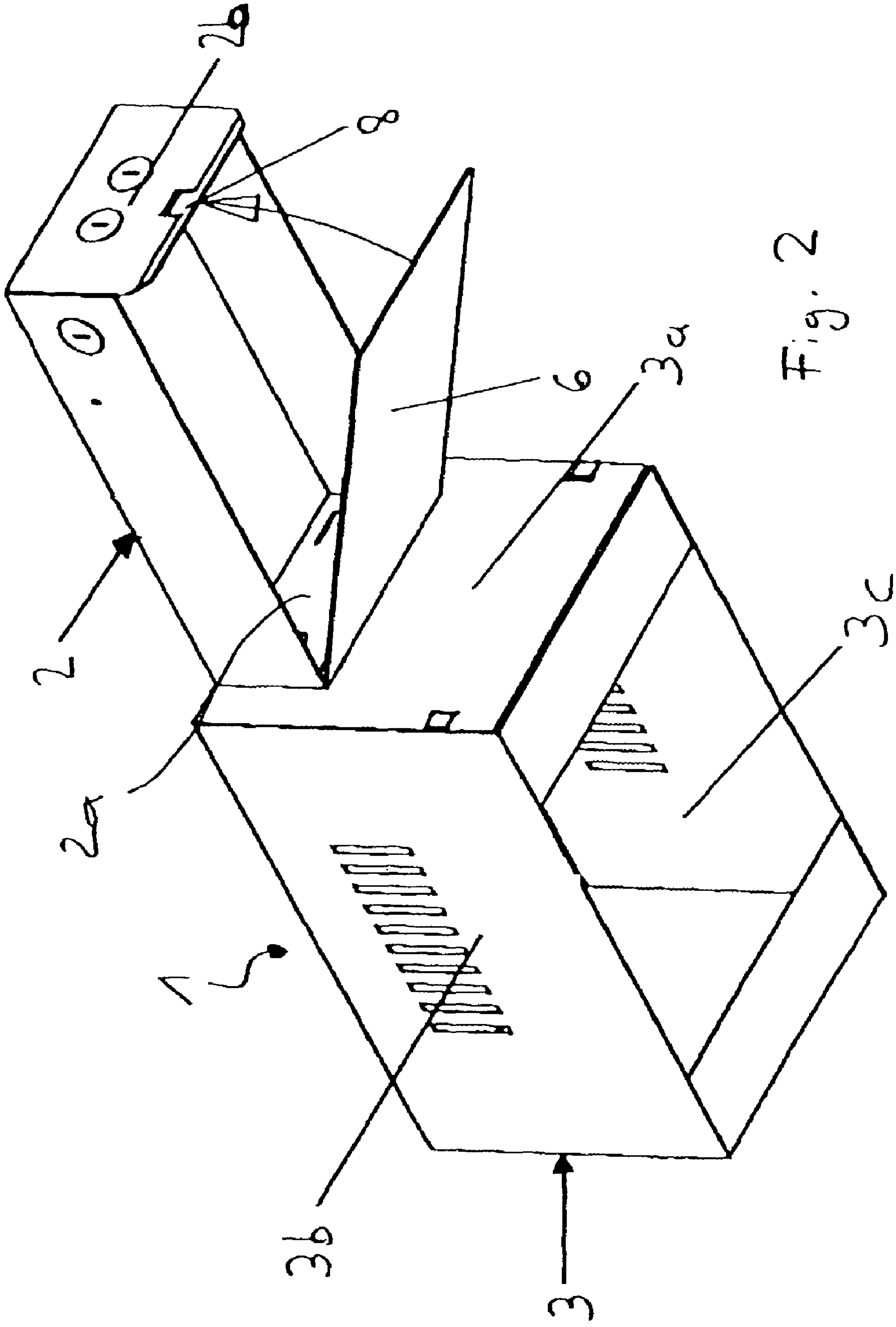
FIG. 2 is a perspective view of the housing according to FIG. 1.

Tabs 7 of cover 6 of first housing module 2 are then inserted into slots 10 of second housing module 3. Cover 6 is then pushed downward toward snap lug 8, as shown especially in FIG. 2, so that snap lug 8 retains removable cover 6 in snap-locking fashion on wall region 2*b* of first housing module 2. The connection between housing modules 2 and 3 is thereby stabilized.

In order to separate housing modules 2 and 3 from one another again, firstly snap lug 8 is released, after which cover 6 can be removed. First snap-lock device 5 is then released, and first housing module 2 is moved downward to bring hooks 4 out of engagement with wall region 3*a*, so that hooks 4 can be pulled out of slots 9 in order to separate the housing modules 2 and 3.

Figure 3:
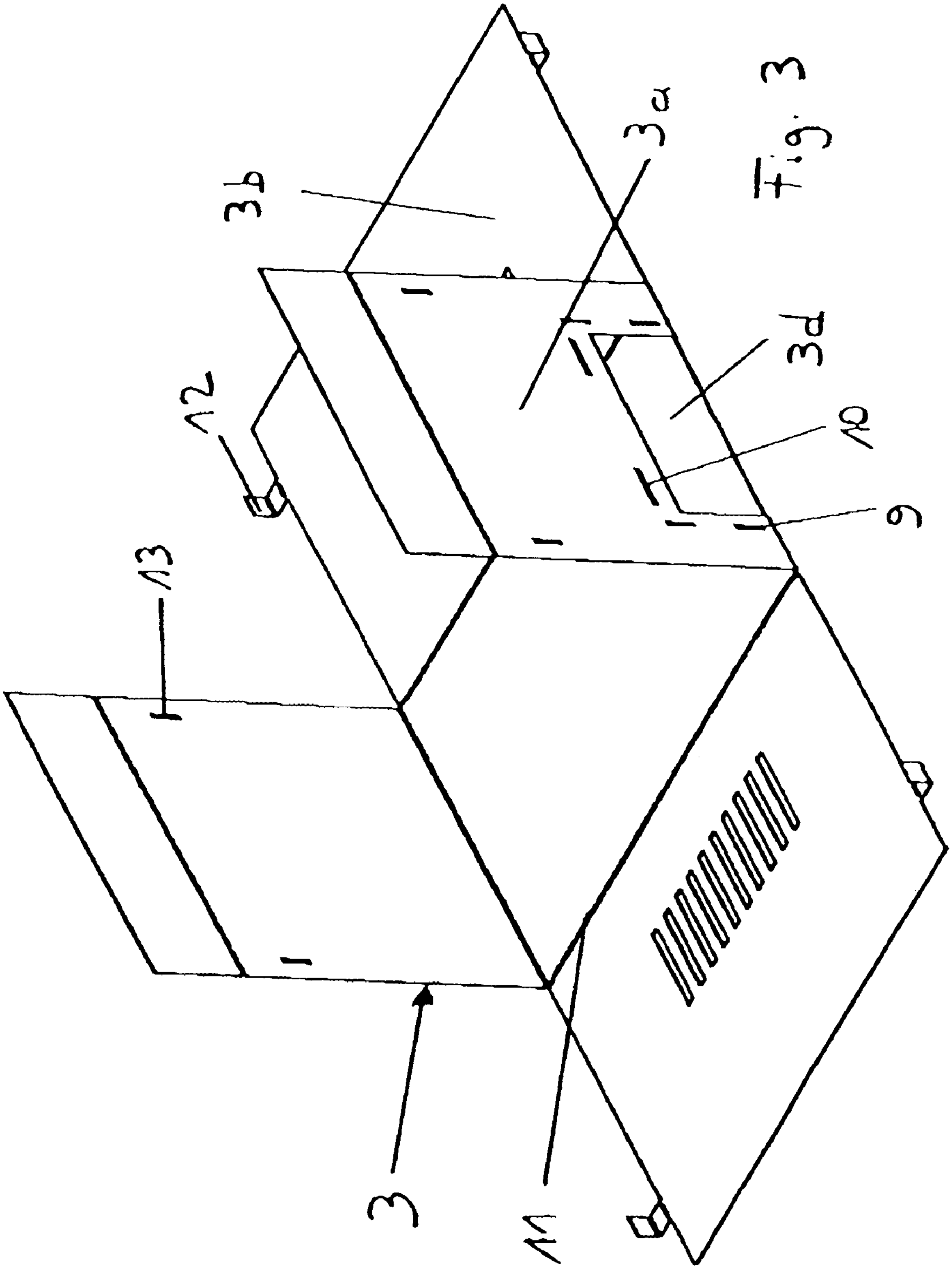
FIG. 3 is a perspective view of a housing module in a partially folded state.

First and second housing modules 2, 3 can be manufactured from a flat sheet. FIG. 3 depicts a second housing module 3 embodied in this fashion, in the partially folded state; fold seams 11, as well as tab-shaped elements 12 and slots 13 that constitute a retention device for the connection of adjacent wall regions 3*a*, 3*b*, are readily apparent here.

I claim:

1. A housing having two housing modules that are releasably connected to one another, wherein the housing modules are releasably connected to one another at oppositely located wall regions via corresponding pairs of slots and hooks in engagement therewith; and a snap-lock device comprising a snap-lug on a wall region of one housing module which is retained against an edge of a cutout located in a wall region of said other housing module is provided which locks the housing modules in the connected state in order to prevent unintentional release, wherein one open side of the housing module is closed off by a cover that is releasably connected to a wall region of the housing module, and the cover possesses tabs which engage into corresponding slots of the other housing module.

2. The housing according to claim 1, wherein the modules are made entirely or partly of metal or plastic.

3. The housing according to claim 1, wherein the modules are embodied for reception of electrical apparatuses.

4. The housing according to claim 3, wherein the modules are embodied for the reception of a radiant element.

5. The housing according to claim 4, wherein one of said modules includes an opening for receiving said radiant element.

6. The housing according to claim 5, further comprising a radiant element housing releasably secured within said opening, said radiant element disposed within said radiant element housing.

7. The housing according to claim 1, wherein at least one housing module is manufactured from a flat sheet that comprises fold seams.

8. A housing having two housing modules that are releasably connected to one another, wherein the housing modules are releasably connected to one another at oppositely located wall regions via corresponding pairs of slots and hooks in engagement therewith; and a snap-lock device comprising a snap-lug on a wall region of one housing module which is retained against an edge of a cutout located in a wall region of said other housing module is provided which locks the housing modules in the connected state in order to prevent unintentional release, wherein one open side of the housing module is closed off by a cover that is releasably connected to a wall region of the housing module, and the cover possesses tabs which engage into corresponding slots of the other housing module, wherein the cover is releasably attached to the wall region of the associated housing module by way of a second snap-lock device comprising a snap-lug on said wall region which is retained against an edge of said cover.

9. A housing having two housing modules that are releasably connected to one another, wherein the housing modules are releasably connected to one another at oppositely located wall regions via corresponding pairs of slots and hooks in engagement therewith; and a snap-lock device comprising a snap-lug on a wall region of one housing module which is retained against an edge of a cutout located in a wall region of said other housing module is provided which locks the housing modules in the connected state in order to prevent unintentional release, wherein at least one housing module is manufactured from a flat sheet that comprises fold seams and said at least one housing module includes retention devices for the connection of wall regions that are adjacent in the folded state, the retention devices comprising a tab-shaped element on one wall region and a slot in a second wail region adjacent to the first wall region, for receiving the tab-shaped element.

10. A radiant element housing, comprising:

a first housing having a base and sidewalk extending upwardly therefrom, said first housing having at least one hook extending outwardly from a first sidewall of said first housing, and a snap-lock device extending outwardly from said first sidewall;

a second housing having a base and sidewalls extending upwardly therefrom, said second housing having a first cutout in a first sidewall, and at least one slot disposed adjacent said first cutout, wherein said at least one hook is removeably secured within said at least one slot and said snap-lock device is retained against an edge of said first cutout, thereby releaseably connecting said first housing to said second housing so that said first sidewall of said first housing is aligned with and adjacent said first cutout, and said second housing having a second cutout disposed in a second sidewall; and a radiant heating element releaseably secured within said second cutout.

* * * * *